US 6,501,470 B1

(12) United States Patent
Miura

(10) Patent No.: US 6,501,470 B1
(45) Date of Patent: Dec. 31, 2002

(54) LOOK-UP TABLE DEVICE AND IMAGE GENERATION DEVICE

(75) Inventor: Katsuhiro Miura, Ichikawa (JP)

(73) Assignee: Namco, Ltd., Tokyo (JP)

( * ) Notice: Subject to any disclaimer, the term of this patent is extended or adjusted under 35 U.S.C. 154(b) by 0 days.

(21) Appl. No.: 09/230,035

(22) PCT Filed: May 21, 1998

(86) PCT No.: PCT/JP98/02233

§ 371 (c)(1),
(2), (4) Date: Jan. 19, 1999

(30) Foreign Application Priority Data

May 21, 1997 (JP) .............................. 9-148690

(51) Int. Cl.⁷ .............................................. G06T 15/00
(52) U.S. Cl. ...................................................... 345/421
(58) Field of Search .................... 345/419, 420, 345/421, 426, 427, 600, 601, 603, 604

(56) References Cited

U.S. PATENT DOCUMENTS

| 5,117,385 A | 5/1992 | Gee ........................... 364/757 |
| 5,313,611 A | 5/1994 | Franklin et al. ............. 395/425 |

FOREIGN PATENT DOCUMENTS

| JP | A-56-123037 | 9/1981 |
| JP | A-61-5628 | 1/1986 |
| JP | A-3-50696 | 3/1991 |
| JP | A-5-81440 | 4/1993 |
| JP | A-5-284346 | 10/1993 |
| JP | A-5-304481 | 11/1993 |
| JP | A-8-123785 | 5/1996 |
| JP | A-9-22343 | 1/1997 |
| JP | A-9-231051 | 9/1997 |
| JP | A-9-282162 | 10/1997 |

*Primary Examiner*—Phu K. Nguyen
(74) *Attorney, Agent, or Firm*—Oliff & Berridge, PLC

(57) ABSTRACT

A section deriving unit (10) derives a section to which a digital input value DIN belongs and outputs a section number IVN, and a computation parameter output unit (20) outputs a computation Parameter CPA corresponding to IVN. A computation unit (30) performs a given computation based on DIN and CPA and outputs the result of the computation as a digital output value DOUT. Any DIN-DOUT conversion characteristic that the user requires can be obtained by setting a delimiter information storage unit (12) and a computation parameter storage unit (22) as appropriate. The computation unit (30) could, for example, perform a calculation DOUT=$a_m X^m + a^{m-1} X^{m-1} + \ldots a_1 X + a_0$, based on computation parameters $a_m$ to $a_0$. This look-up table device can be used for gamma compensation or depth cueing conversions.

11 Claims, 13 Drawing Sheets

| DIGITAL INPUT VALUE DIN | SECTION NUMBER IVN |
|---|---|
| 00000~00010 | 0 (000) |
| 00011~01000 | 1 (001) |
| 01001~01011 | 2 (010) |
| 01100~01110 | 3 (011) |
| 01111~10101 | 4 (100) |
| 10110~11000 | 5 (101) |
| 11001~11011 | 6 (110) |
| 11100~11111 | 7 (111) |

E ↗ (points to row 01001~01011)

Fig. 2

STORAGE UNIT 114

| DELIMITER VALUE DMV |
|---|
| 0 1 1 1 0 |

Fig. 4A

STORAGE UNIT 124

| ADDRESS | DELIMITER VALUE DMV |
|---|---|
| 0 | 0 1 0 0 0 |
| 1 | 1 1 0 0 0 |

Fig. 4B

STORAGE UNIT 134

| ADDRESS | DELIMITER VALUE DMV |
|---|---|
| 00 | 0 0 0 1 0 |
| 01 | 0 1 0 1 1 |
| 10 | 1 0 1 0 1 |
| 11 | 1 1 0 1 1 |

Fig. 4C

LOOK-UP TABLE DEVICE AND IMAGE GENERATION DEVICE

TECHNICAL FIELD

The present invention relates to a look-up table device and an image generation device that uses the same.

BACKGROUND OF ART

A look-up table device that is known in the art receives a digital input value and uses a given table to output a digital output value.

An example of such a look-up table device is described below. This look-up table device uses memory that is provided with an n-bit address bus and a k-bit data bus, where the address bus is used as an input signal line and the data bus is used as an output signal line. With a look-up table device of this format, the table has a form such that each of k-bit digital output values is stored in each of $2^n$ storage areas which correspond to. n-bit digital input values. In other words, the look-up table device of this type must have a storage capacity of at least $2^n \times$k-bit of memory.

If either n or k is large, therefore, the table itself will become large, leading to a problem concerning an increase in the necessary storage capacity therefor. Particularly if n is large, the necessary storage capacity will increase exponentially in correspondence with $2^n$. There is therefore a demand for a look-up table device that can reduce the necessary storage capacity to a minimum, even in such a case. In addition, when the necessary storage capacity increases in this configuration, the time taken to overwrite the values in the table also increases. This raises another problem in that this device is unsuitable for applications where rapid overwriting of table values is necessary.

There is thus a further demand for a look-up table device that enables various different conversions, with few table values.

The present invention was devised in the light of the above technical problems and has as an objective thereof the provision of a look-up table device that makes it possible to implement various conversions within a limited storage capacity, and an image generation device that uses that look-up table device.

DISCLOSURE OF INVENTION

To solve the above described technical problems, the present invention provides a look-up table device for converting a digital input value into a digital output value, comprising:

section deriving means for receiving the digital input value, deriving the section to which the digital input value belongs, and outputting section information that is specifies the section;

computation parameter output means for receiving the section information and outputting a computation parameter corresponding to the section information; and computation means for receiving the digital input value and the computation parameter, performing a given computation based on the digital input value and the computation parameter, and outputting the result of the computation as the digital output value.

With this aspect of the invention, the section deriving means first derives section information such as the number of a section to which the digital input value belongs, then the computation parameter output means outputs a computation parameter based on this section information. The computation means then performs a given computation based on the digital input value and the computation parameter, to obtain the digital output value.

With this aspect of the invention, it is not necessary to provide the same number of digital output values to match all of the digital input value. This means that it is possible to greatly reduce the necessary storage capacity, in comparison with a conventional look-up table device. Moreover, the device of the present invention is advantageous in that it makes it possible to implement various different types of conversion, by setting different combinations of computation parameters and given computations.

In a second aspect of the present invention, the section deriving means comprises means for storing delimiter information of sections classifying the digital input value, and derives the section to which the digital input value belongs based on the delimiter information. The way of delimiting sections can be varied in various ways by providing such storage means and modifying the contents stored in this storage means as appropriate. AS a result, it is possible to obtain any of various input-output digital value conversion characteristics that the user desires. Note that the delimiter information in this case is not restricted to delimiter values for the sections; various other values such as the central values of the sections could equally well be used instead.

In a third aspect of the present invention, the computation parameter output means comprises means for storing a computation parameter corresponding to each of the section information, and reads out the computation parameters from the storage means based on the section information. The values of computation parameters to be used in the given computation can be modified in various ways by providing such storage means and modifying the contents stored in this storage means as appropriate. As a result, it is possible to obtain any of various input-output digital value conversion characteristics that the user desires.

In a fourth aspect of the present invention, the computation means obtains a difference value between the digital input value and a delimiter value that is specified by delimiter information of the section to which the digital input value belongs, and performs the given computation based on the difference value and the computation parameter. Performing the computation based on such a difference value makes it easy to obtain a conversion characteristic with no discontinuities. This aspect also has the advantage of making it possible to utilize the delimiter value used by the section deriving means, as a base value for obtaining the difference value.

In a fifth aspect of the present invention, the computation parameter output means outputs the coefficients am to $a_0$ of the expression $_mX^m + a_{m-1}X^{m-1} + \ldots a_1X + a_0$ in m (where m is greater than or equal to 1) degree expression, as the computation parameters; and the computation means obtains $a_mX^m + a_{m-1}X^{m-1} + \ldots a_1X + a_0$, based on X that is specified by the digital input value and $a_m$ to $a_0$ that are included within the computation parameters, and outputs the obtained result as the digital output value. Performing the given computation based on a linear computation equation in this manner makes it possible to simplify the hardware configuration of the computation means.

A sixth aspect of the present invention relates to a device comprising at least one of a gamma compensation means that performs gamma compensation by using the above look-up table device, and a depth cueing means that performs depth cueing by using the above look-up table device; and means for generating an image to which at least one of the gamma compensation and the depth cueing has been applied. By using the look-up table device of the present invention for the conversion of gamma compensation or depth cueing in this manner, not only is it possible to provide any user-desired conversion processing, it is also possible to reduce the size of the hardware that performs such conversion.

BRIEF DESCRIPTION OF DRAWINGS

FIG. 2 shows an example of the relationships between digital input values and section numbers (section information);

FIGS. 4A, 4B, and 4C illustrate the delimiter values that are stored in the storage units;

BEST MODE FOR CARRYING OUT THE INVENTION

Preferred embodiments of the present invention are described below with reference to the accompanying drawings.

Embodiment 1

1. Overall Configuration

Figure 1:
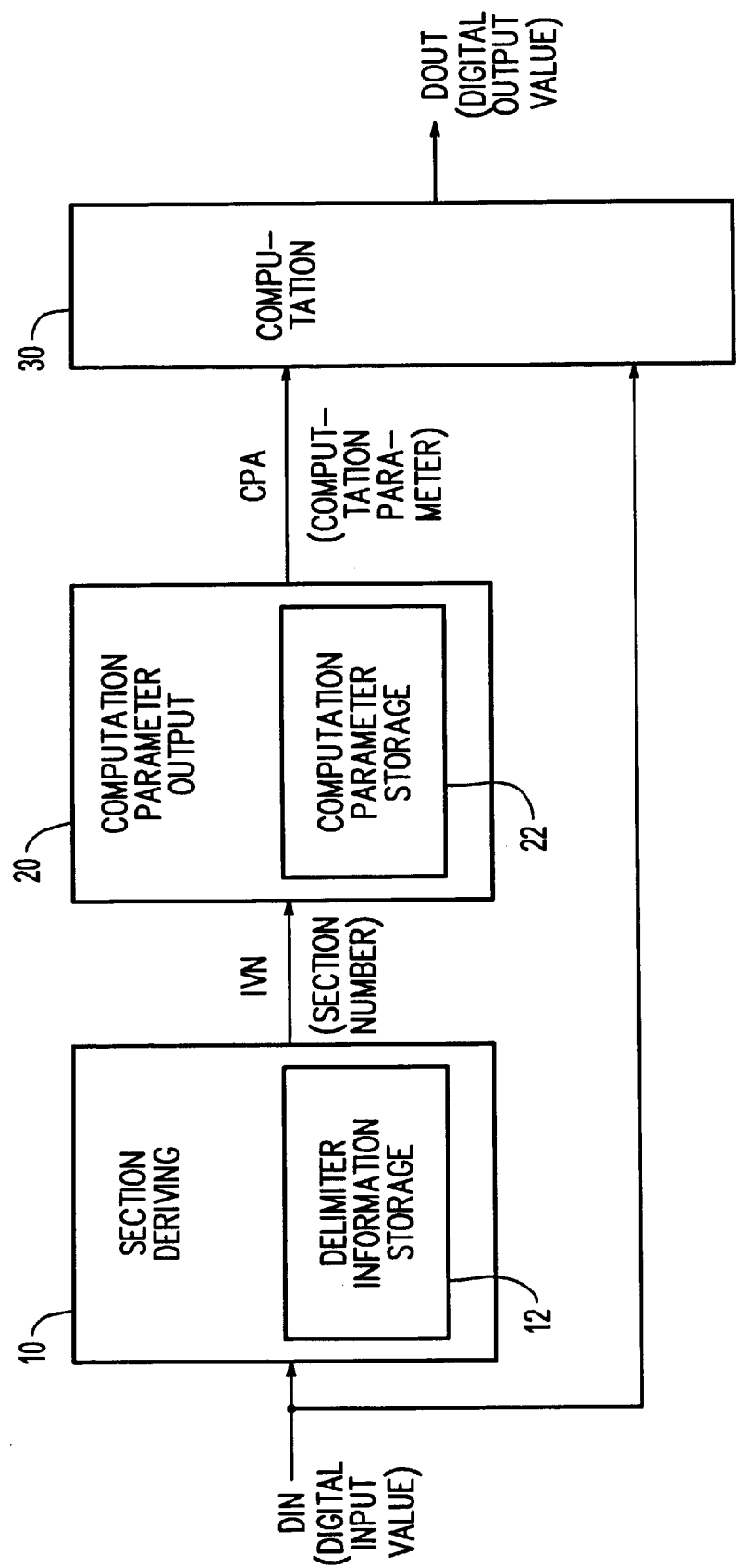
FIG. 1 is a function block diagram of an example of the configuration of a look-up table device in accordance with Embodiment 1.

A function block diagram of an example of the look-up table device of Embodiment 1 is shown in FIG. 1. This look-up table device comprises a section deriving unit 10, a computation parameter output unit 20, and a computation unit 30.

The section deriving unit 10 receives a digital input value DIN, derives the section to which DIN belongs, and outputs section information (internal information) such as a section number (internal number) IVN, and it could be configured of a CPU that operates in accordance with software implementing the functions of the section deriving unit 10, random logic circuit, or the like. Various information other than IVN can be used as this section information, provided such information is capable of specifying at least one section.

The computation parameter output unit 20 receives the section number IVN and outputs one or more computation parameters CPA corresponding to that IVN, and it could be configured of a CPU that operates in accordance with software implementing the functions of the computation parameter output unit 20, random logic circuit, or the like. When, for example, the computation unit 30 performs a calculation such as $Y=a_m X_m+a_{m-1}X^{m-1}+\ldots a_1 X+a_0$ (where m is greater than or equal to 1), the computation parameter output unit 20 outputs the coefficients $a_m$ to $a_0$ of this equation as CPA.

The computation unit 30 receives the digital input value DIN and the computation parameters CPA, performs a given calculation based on DIN and CPA, and outputs the computation result as the digital output value DOUT, and it is configured of a CPU that operates in accordance with software implementing the functions of the computation unit 30, random logic circuit, or the like.

The conversion of DIN to DOUT is realized in the present embodiment as above described.

Note that the section deriving unit 10 is not particularly restricted in any manner, but it preferably comprises a delimiter information storage unit 12 for storing delimiter information such as delimiter values for the sections. In this case, the section deriving unit 10 derives the section to which DIN belongs according to these delimiter values. Various information other than delimiter values can be used as the delimiter information, such as the central values of the sections. Note that the delimiter information storage unit 12 could be configured of memory or registers, by way of example.

The computation parameter output unit 20 is also not particularly restricted in any manner, but it preferably comprises a computation parameter storage unit (parameter table) 22 for storing CPA corresponding to each of IVN. In this case, the computation parameter output unit 20 uses IVN to read the CPA from the computation parameter storage unit 22 and then outputs the CPA. Note that the computation parameter storage unit 22 could be configured of memory or registers, by way of example.

The provision of the delimiter information storage unit 12 and computation parameter storage unit 22 makes it possible to implement any conversion that a user such as a programmer desires, by enabling the user to overwrite the contents of these storage units. In other words, the user can implement various conversion by overwriting the contents of the delimiter information storage unit 12 or the computation parameter storage unit 22.

The present embodiment is characterized in that a given computation is performed based on DIN and CPA that is set for the section to which DIN belongs, to obtain DOUT. This makes it possible to perform various different conversions within a limited storage capacity.

If, for example, DIN has n bits and DOUT has k bits, an ordinary look-up table device would store each of k-bit DOUT values in each of $2^n$ storage areas which correspond to n-bit DIN values. In other words, it is necessary to have a storage capacity of at least $2^n \times$k-bit of memory.

In contrast thereto, the device of the present embodiment does not need to provide a number ($2^n$) of values of DOUT to correspond to all values of DIN that are in sequence. If the number of sections is i, for example, a capacity that can hold (i−1) delimiter values and i computation parameter is sufficient. This means that the necessary storage capacity can be reduced dramatically, in comparison with the conventional art.

Another method that could be considered is to obtain the digital output value DOUT by simply performing a given computation on the digital input value DIN, instead of using computation parameters such as those used by the present embodiment. Use of this method has the advantage of reducing the required storage capacity even further, in comparison with a look-up table device.

However, many kinds of different conversion characteristics are necessary during image or sound generation, and it often happens that the conversion characteristics in such cases cannot be represented by simple equations. This means that the above mentioned method of obtaining DOUT by simply performing a given computation on DIN can rarely be used for the many kinds of different conversions required in such a case. If it were possible to use such method, for the sake of argument, the size of the computation unit will become too big because of factors such as the large number of degree of such equations.

Thus each of the method of using a conventional look-up table device and this method of obtaining DOUT by simply performing a given computation has advantages and disadvantages.

In contrast thereto, not only does the device of the present embodiment make it possible to dramatically reduce the necessary storage capacity, it also makes it possible to implement the many kinds of different conversion characteristics that are necessary during image or sound generation, by combining various computation parameters and given computations performed by the computation unit 30.

2. Section Deriving Unit

The description now turns to a detailed example of the section deriving unit 10. The role of the section deriving unit 10 is to derive the section to which the digital input value DIN belongs and output the corresponding section number IVN.

An example of the relationships between value of DIN and the values of IVN to be output in correspondence to DIN is shown in FIG. 2. For example, when DIN is 01101, DIN belongs to section 3 (01100 to 01110) (see E in FIG. 2), so 3 (011) is output as a corresponding IVN.

Figure 3:
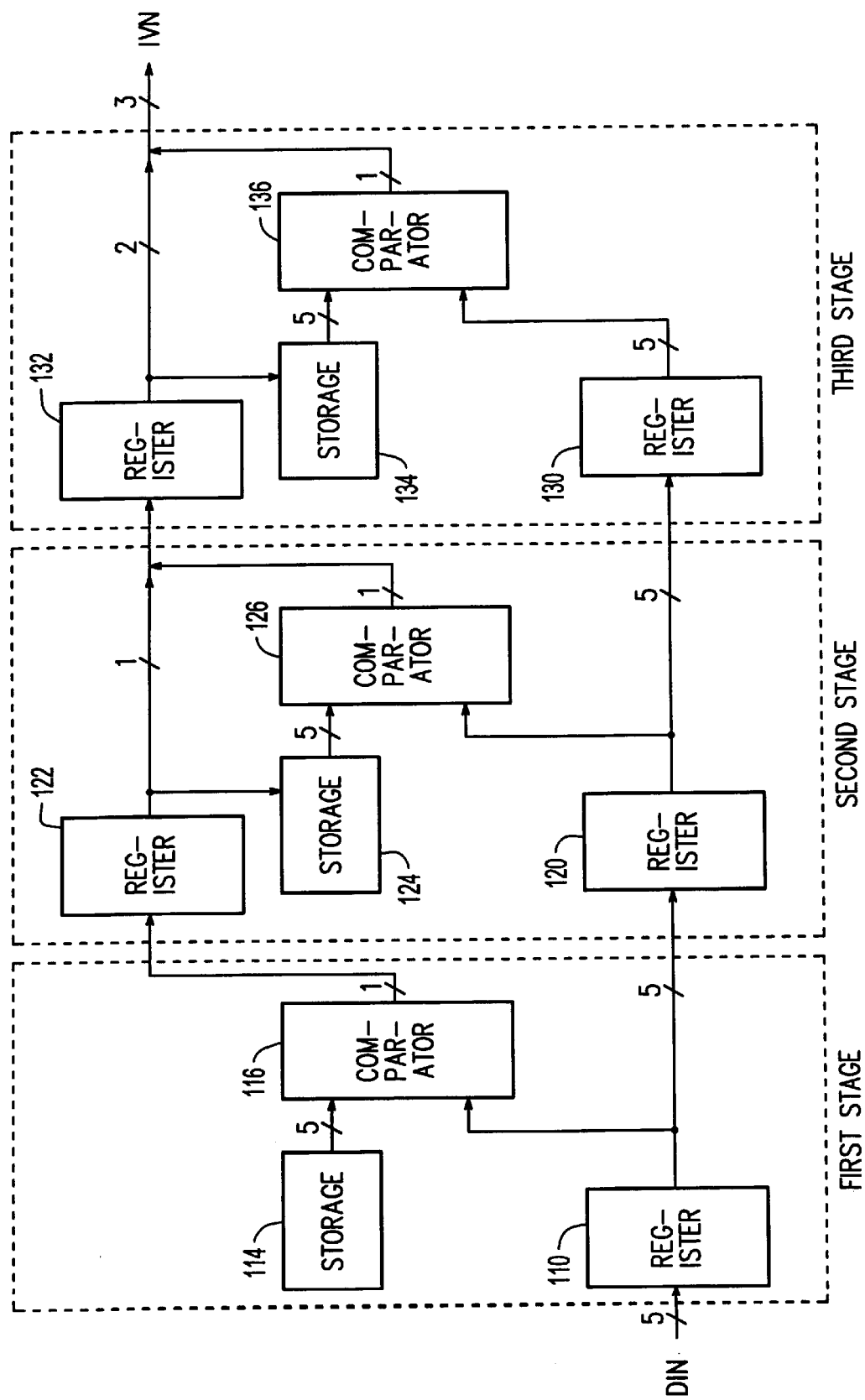
FIG. 3 is a function block diagram of an example of the configuration of the section deriving unit.

An example of the configuration of the section deriving unit 10 is shown in FIG. 3. In this example, the section is derived by pipeline processing that comprises first to third stages. DIN is sequentially transferred between and stored within registers (pipeline registers) 110, 120, and 130, based on a transfer clock signal. The value of DIN that is transferred to each of the registers 110, 120, and 130 is sequentially compared with delimiter values stored in storage units 114, 124, and 134, by comparators 116, 126, and 136. A 3-bit section number IVN is output based on the results of these comparisons.

FIGS. 4A, 4B, and 4C show examples of delimiter values stored in the storage units 114, 124, and 134. These storage units 114, 124, and 134 correspond to the delimiter information storage unit 12 of FIG. 1.

In this case, the delimiter value 01110 stored in the storage unit 114 (FIG. 4A) delimits between sections 0 to 3 (00000 to 01110) and sections 4 to 7 (01111 to 11111) (see FIG. 2).

The delimiter values 01000 and 11000 stored in the storage unit 124 (FIG. 4B) delimit between sections 0 and 1 and sections 2 and 3, and between sections 4 and 5 and sections 6 and 7, respectively. If address 0 is input, 01000 is output from the storage unit 124, and if address 1 is input, 11000 is output therefrom.

The delimiter value 00010, 01011, 10101, and 11011 stored in the storage unit 134 (FIG. 4C) delimit between sections 0 and 1, sections 2 and 3, sections 4 and 5, and sections 6 and 7, respectively. If address 00, 01, 10, or 11 is input, 00010, 01011, 10101, or 11011 is output from the storage unit 134.

The operation of the section deriving unit 10 will now be described with reference to FIG. 5.

Figure 5:
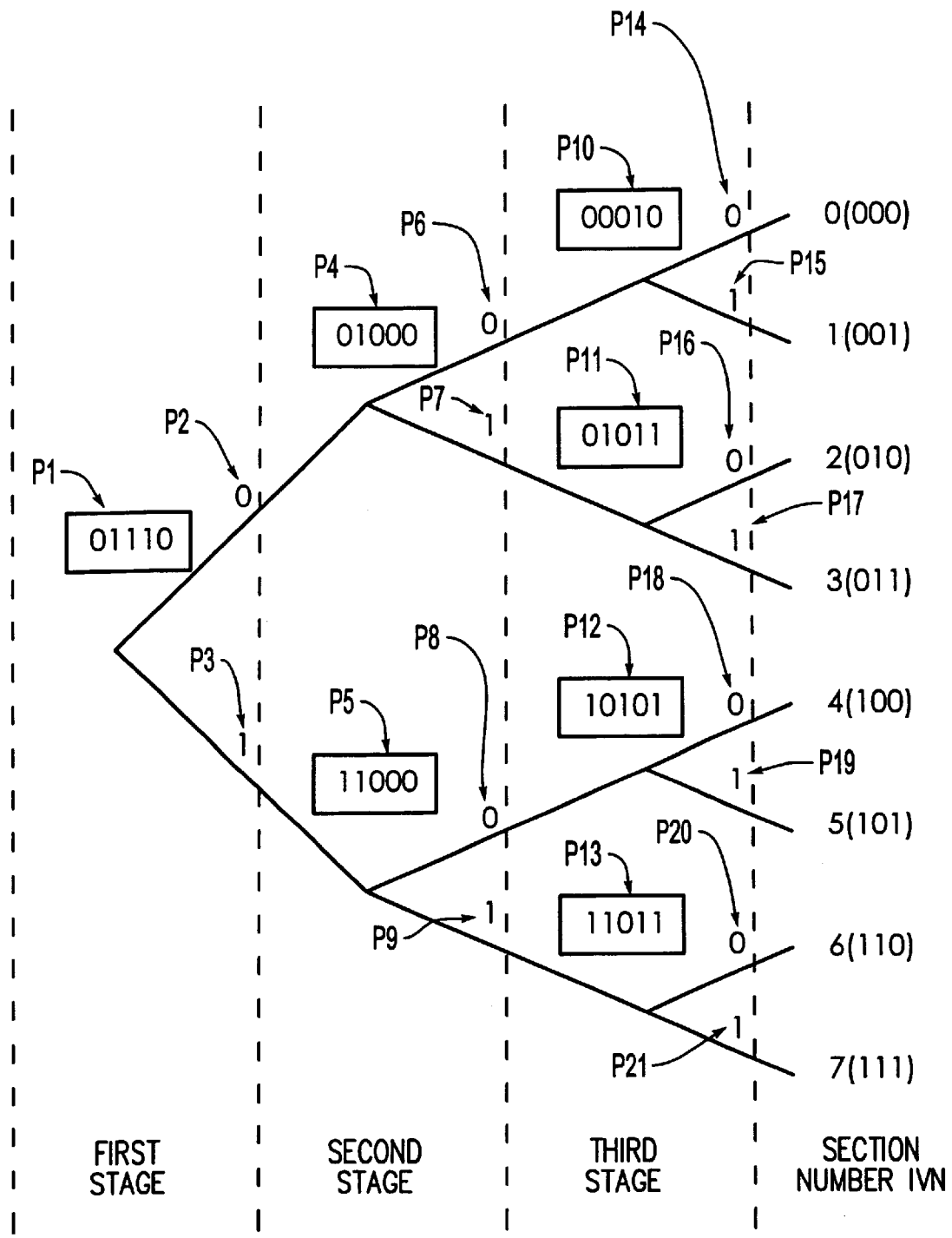
FIG. 5 illustrates the operation of the section deriving unit.

First of all, the first-stage comparator 116 compares the digital input value DIN and the delimiter value 01110 that is stored in the storage unit 114 (see FIG. 4A and P1 in FIG. 5). When DIN is less than or equal to the delimiter value, the comparator 116 outputs 0 to the register 122 (P2); when it is greater than the delimiter value, it outputs 1 thereto (P3).

Using the value stored in the register 122 as an address, the corresponding delimiter value is then read from the storage unit 124 and is input to the comparator 126. For example, when the value (address) stored in the register 122 is 0 or 1, the corresponding value 01000 or 11000 is input to the comparator 126 (see FIG. 4B and P4 and P5 of FIG. 5).

After DIN has been compared by the first-stage comparator 116, it is input to the comparator 126 through the register 120, Therefore, DIN is compared with 01000 or 11000 in the second stage. When the result of the comparison of DIN with either of these values is such that DIN is found to be less than or equal thereto, the comparator 126 outputs 0 to the register 132; when DIN is greater, 1 is output (P6 to P9).

The output of the register 122 is stored as the most significant bit in the register 132 and the output of the comparator 126 is stored as the least significant bit therein. The register 132 therefore stores 00, 01, 10 or 11.

Next, the value stored in the register 132 is used as an address to read a corresponding delimiter value from the storage unit 134 and input it to the comparator 136. for example, when the value stored in the register 132 is 00, 01, 10, or 11, the value 00010, 01011, 10101, or 11011 is input to the comparator 136 (FIG. 4C and P10 to P13).

At the same time, DIN is also input to the comparator 136 via the register 130, after the comparison by the second-stage comparator 126. This means that DIN is compared with 00010, 01011, 10101 or 11011 at the third stage. When the result of the comparison of DIN with any of these values is such that DIN is found to be less than or equal thereto, the comparator 136 outputs 0; when DIN is greater, 1 is output (P14 to P21).

The section number IVN that is the eventual result is data in which the output of the register 132 is the most significant bit and the output of the comparator 136 is the least significant bit. For example, when the comparison results of the comparators 116, 126, and 136 is 0, 0, and 0 (P2, P6, P14), IVN is 0 (000); when the results are 0, 1, and 1 (P2, P7, P17), IVN is 3 (011).

In the above described manner, the number IVN of the section to which the digital input value DIN belongs is derived. It should be noted, however, that the configuration of the section deriving unit 10 is not limited to that shown in FIG. 3 and thus it can be implemented in many other ways, so that IVN could be derived by a sequential retrieval instead of a two-step retrieval.

3. Computation Unit

An example of the detailed configuration of the computation unit 30 will now be described with reference to FIG. 6. The computation unit 30 shown in FIG. 6 comprises a difference unit 32, a multiplier unit 34, and an adder unit 36.

In this case, the difference unit 32 obtains the difference between a delimiter value DMV (see FIGS. 4A to 4C) and a digital input value DIN, and outputs X, which is the result of this computation, to the multiplier unit 34.

The multiplier unit 34 multiplies this X by $a_1$ (section slope; one of the computation parameters) from the computation parameter output unit 20, and outputs $a_1X$, which is the result of this computation, to the adder unit 36.

The adder unit 36 adds this $a_1X$ to $a_0$ (initial section value; another one of the computation parameters), and outputs ($a_1X+a_0$), which is the result of this computation, as the digital output value DOUT.

Figure 6:
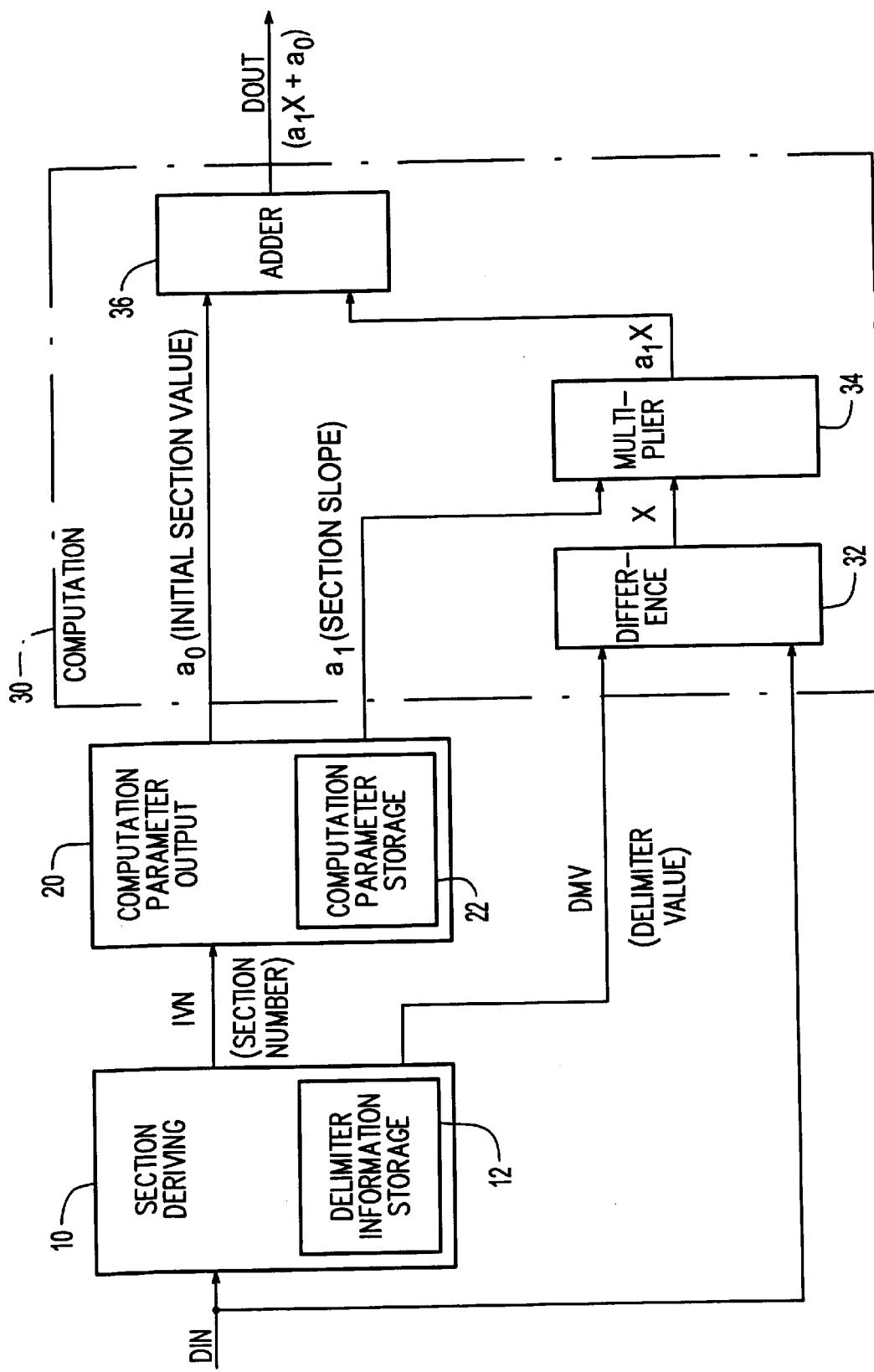
FIG. 6 illustrates a detailed example of the computation unit.
Figure 7:
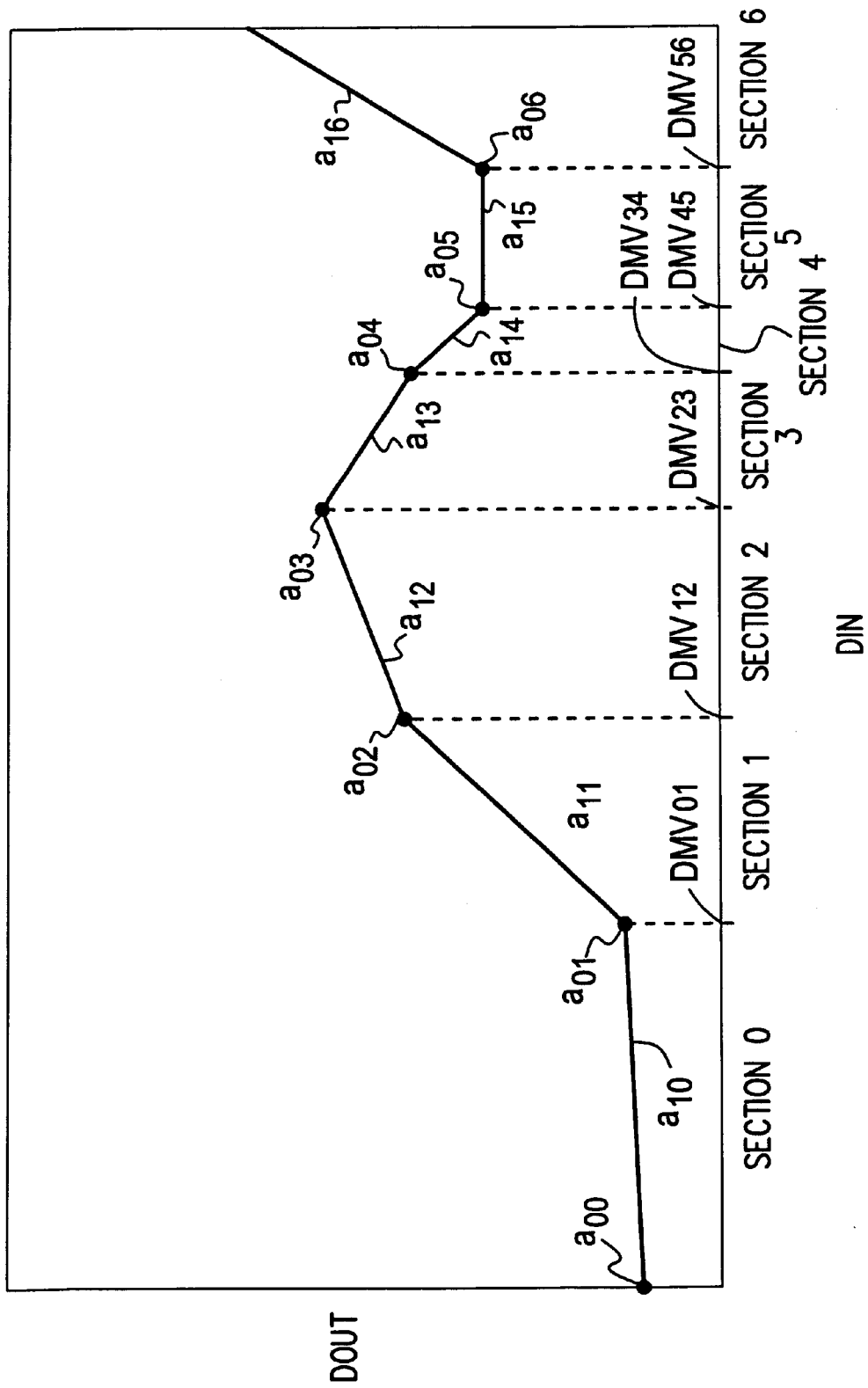
FIG. 7 shows an example of a DIN-DOUT conversion characteristic.

An example of the DIN-DOUT conversion curve obtained by the look-up table device of FIG. 6 is shown in FIG. 7. As shown in FIG. 7, an initial section value $a_{00}$ and a section slope $a_{10}$ is set for section 0. Similarly, initial section values $a_{01}$, $a_{02}$, $a_{03}$, $a_{04}a_{05}$, and $a_{06}$ and section slopes $a_{11}$, $a_{12}$, $a_{13}$, $a_{14}$, $a_{15}$, and $a_{16}$ are set for each of sections 1, 2, 3, 4, 5, and 6.

Thus computation parameters are set for each section in the present embodiment. In other words, the computation parameter output unit 20 reads out from the computation parameter storage unit 22 an initial section value and a section slope that are computation parameters set for each section, based on the section number IVN (section information) from the section deriving unit 10, and outputs them to the computation unit 30. The computation unit 30 then performs a given computation based on that initial section value and section slope, to obtain DOUT for output.

As is clear from FIG. 7, the DIN-DOUT conversion characteristics can be set in many various ways by changing the settings of the computation parameters $a_{00}$ to $a_{06}$ and $a_{10}$ to $a_{16}$. This means that a user such as a programmer can perform various different conversions by changing the contents stored in the computation parameter storage unit 22.

It is also possible to change the delimiter values $DMV_{01}$, $DMV_{12}$, $DMV_{23}$, $DMV_{34}$, $DMV_{45}$, and $DMV_{56}$, (see FIG. 7) by changing the contents stored in the delimiter information storage unit 12. This also makes it possible to provide various different conversions.

The present embodiment has the advantage of needing only the capacity necessary for storing $DMV_{01}$ to $DMV_{56}$, $a_{00}$ to $a_{06}$, and $a_{10}$ to $a_{16}$, as a storage capacity although such various conversions are possible.

Figure 8:
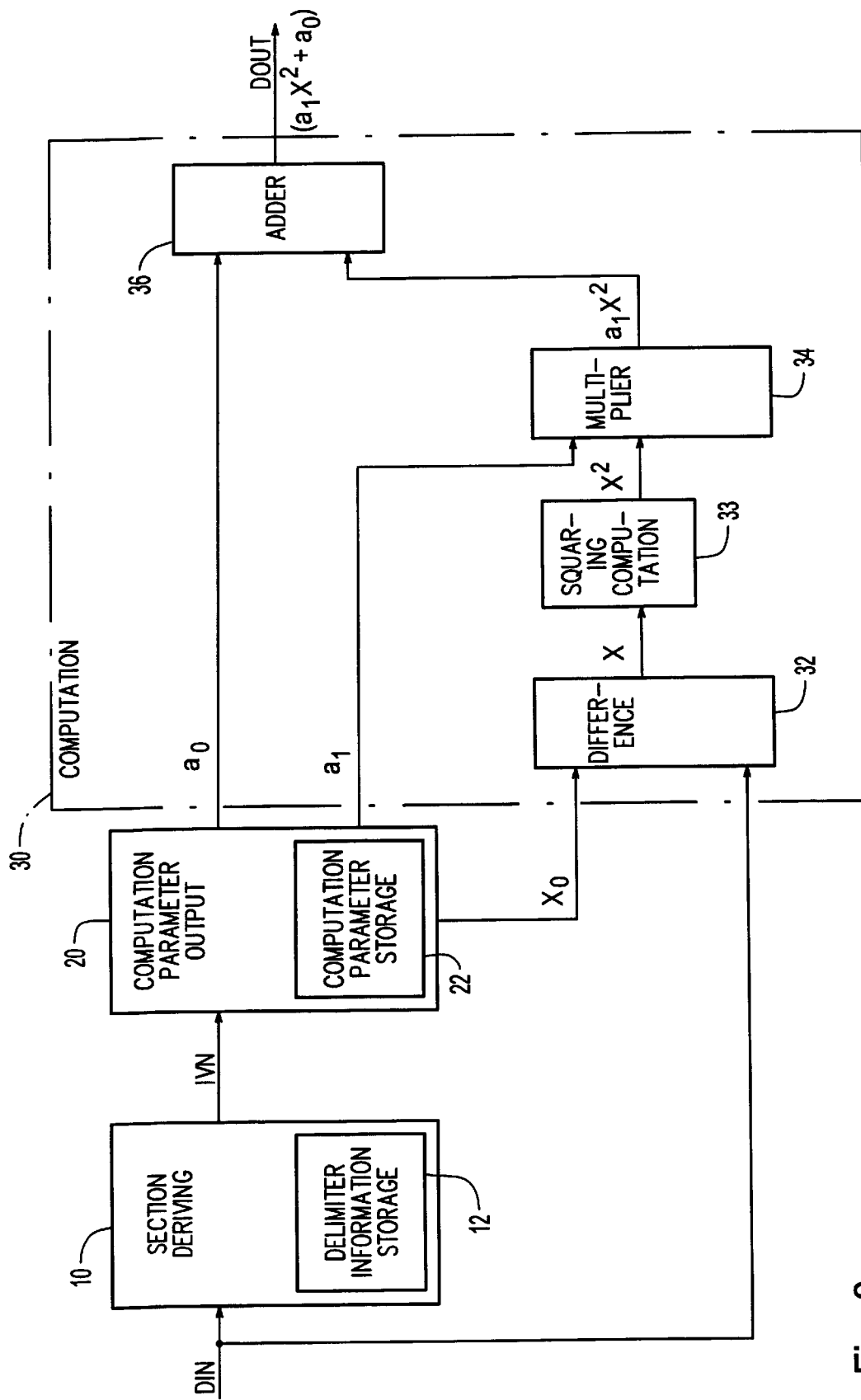
FIG. 8 illustrates another detailed example of the computation unit.
Figure 9:
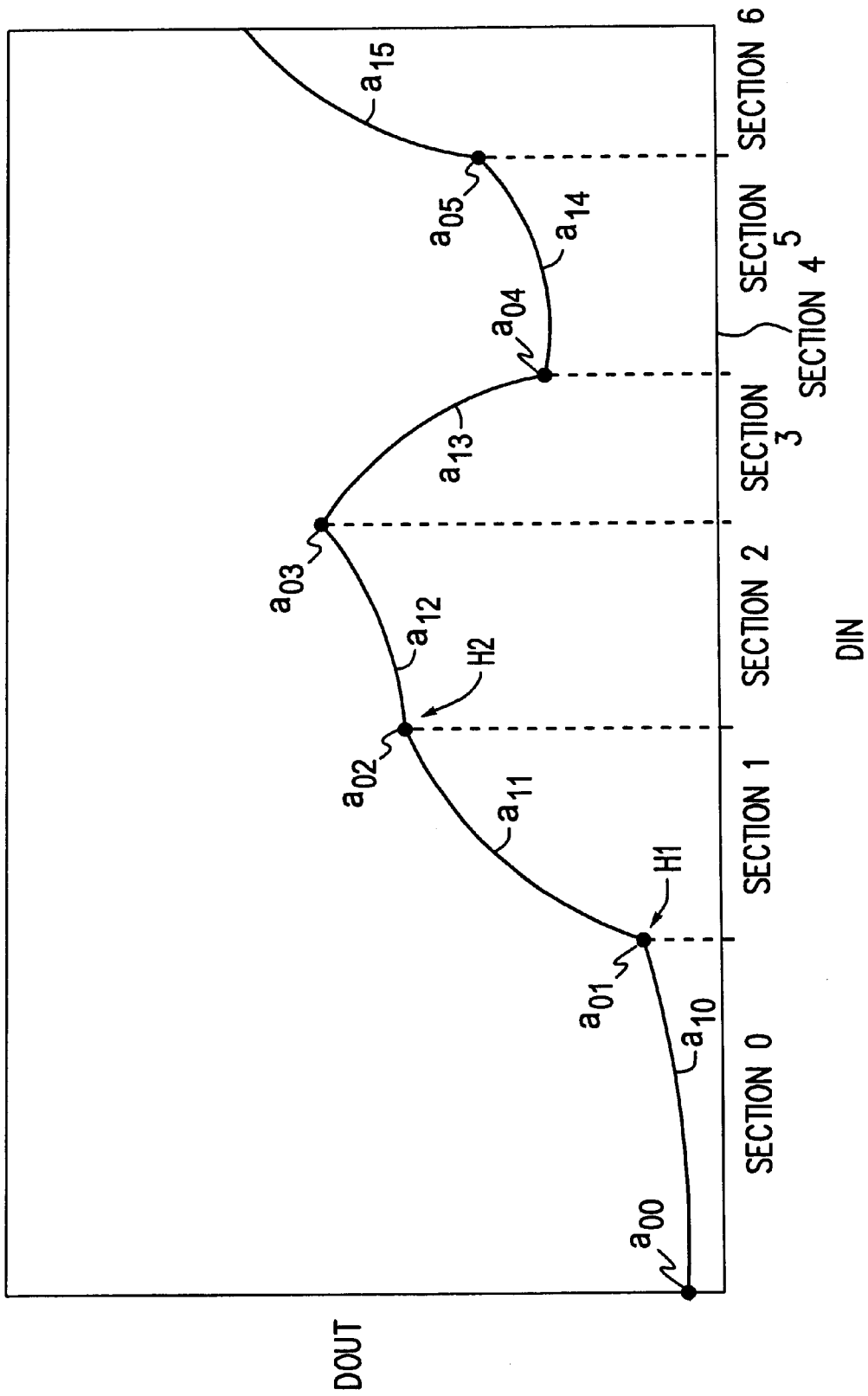
FIG. 9 shows another example of a DIN-DOUT conversion characteristic.

Another detailed configurational example of the computation unit 30 will now be described, with reference to FIG. 8. The configuration of FIG. 8 differs from that of FIG. 6 in that a squaring computation unit 33, which obtains $X^2$ from input X, is inserted between the difference unit 32 and the multiplier unit 34. In the configuration of FIG. 6, the delimiter value DMV was used as a base value for the difference (X=DIN−DMV), but in the configuration of FIG. 8, one of the computations parameters $X_0$ is used as the base value (X=DIN−$X_0$). It is thus not necessary to always use the delimiter value DMV as the base value for the difference Conversely, the utilization of DMV as the base value for the difference, as in the configuration of FIG. 6, has the advantage of removing the necessity of including a base value for the difference within the computation parameters. 10 An example of the DIN-DOUT conversion characteristic obtained by the look-up table device of FIG. 8 is shown in FIG. 9. FIG. 9 differs from FIG. 7 in that FIG. 7 consists of straight lines, such as that between the points G1 and G2 whereas FIG. 9 includes quadratic curves, such as one between is the points H1 and H2.

Note that, although a quadratic curve joins the points H and H2 in FIG. 9, the invention is not limited thereto and other curves such as cubic curves could be used to join such points, as well as curves that cannot be expressed by a line an computation equation (such as sine curves, cosine curves, or Bezier curves).

Figure 10:
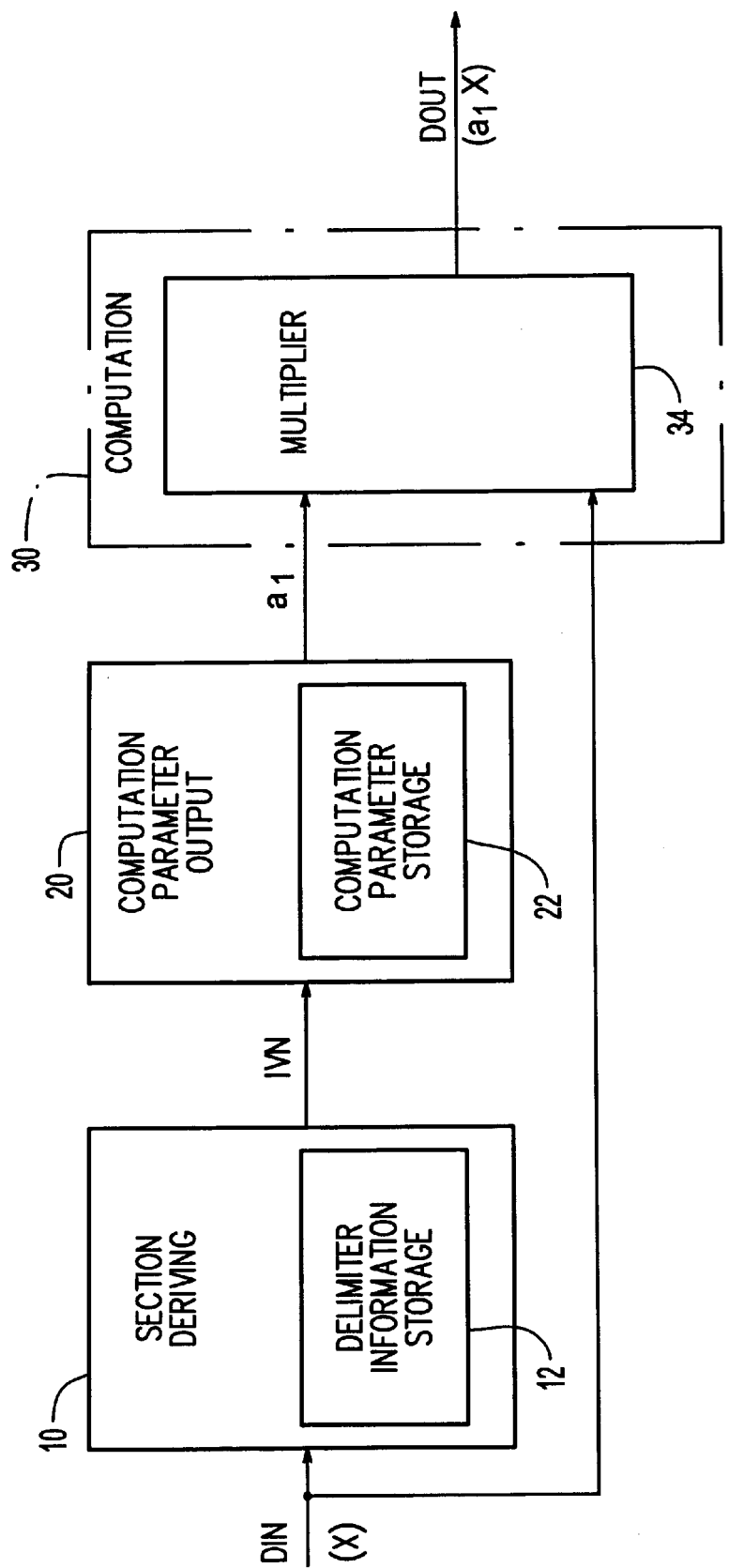
FIG. 10 illustrates a further detailed example of the computation unit.

A further example of the detailed configuration of the computation unit 30 is shown in FIG. 10. The computation unit 30 of FIG. 10 comprises the multiplier unit 34 alone. The multiplier unit 34 obtains $a_1X$ from DIN (=X) and $a_1$ from the computation parameter output unit 20 This $a_1X$ is output as DOUT.

Figure 11:
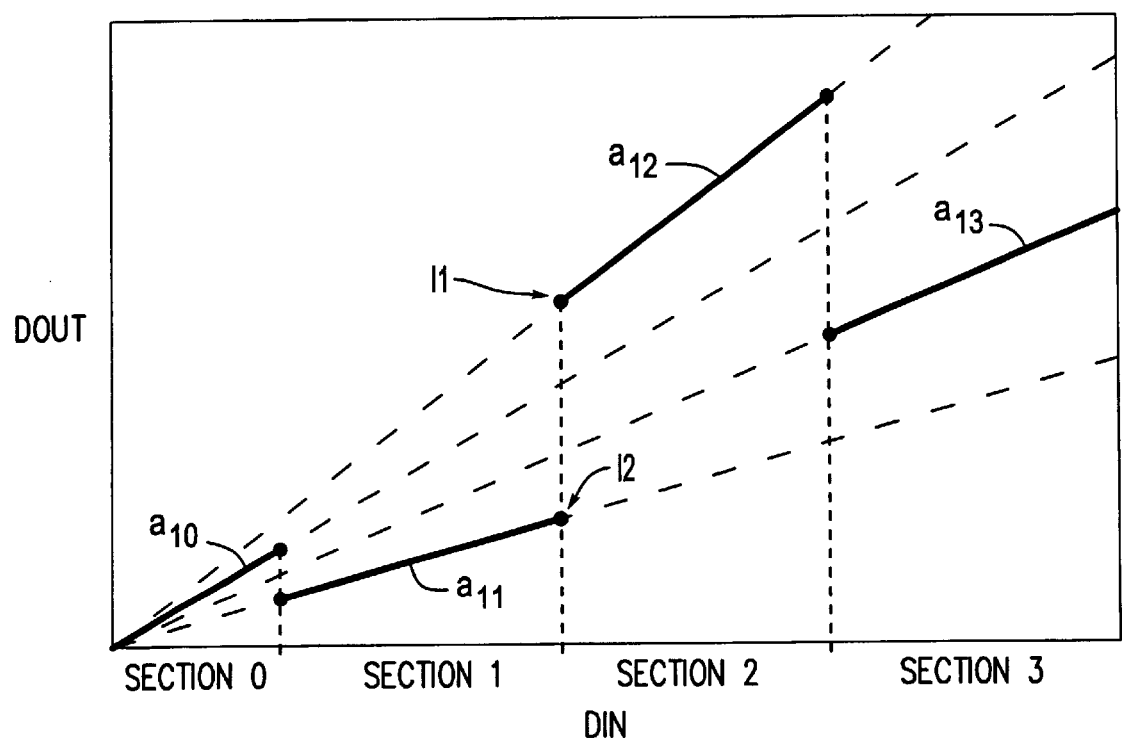
FIG. 11 shows a further example of a DIN-DOUT conversion characteristic.

An example of the DIN-DOUT conversion characteristic obtained by the look-up table device of FIG. 10 is shown if FIG. 11. AS shown in FIG. 11, section slopes $a_{10}$, $a_{11}$, $a_{12}$, and $a_{13}$, are set for sections 0, 1, 2, and 3. The DIN-DOUT conversion characteristic within section 0 is a straight line passing through the origin and with a slope of $a_{10}$, and within section 1 it is a straight line passing through the origin but with a slope of $a_{11}$. Sections 2 and 3 have the same form.

FIG. 10 differs from FIGS. 6 and 8 in that no difference is obtained between DIN and the delimiter value DMV. In other words, DIN is input directly to the multiplier unit 34. With the configuration of FIG. 10, for example, there can be several discontinuities in the conversion characteristic, such as those shown at I1 and I2 of FIG. 11. In contrast thereto, the configurations that obtain differences such as those of FIGS. 6 and 8 can easily obtain continuous conversion characteristics such as those shown in FIGS. 7 and 9.

Note that the configuration of the computation unit 30 is not limited to the examples shown in FIGS. 6, 8, and 10, so that it can be configured in many different ways provided that it can perform a given computation based on at least a digital input value DIN and a computation parameter CPA.

Embodiment 2

Figure 12:
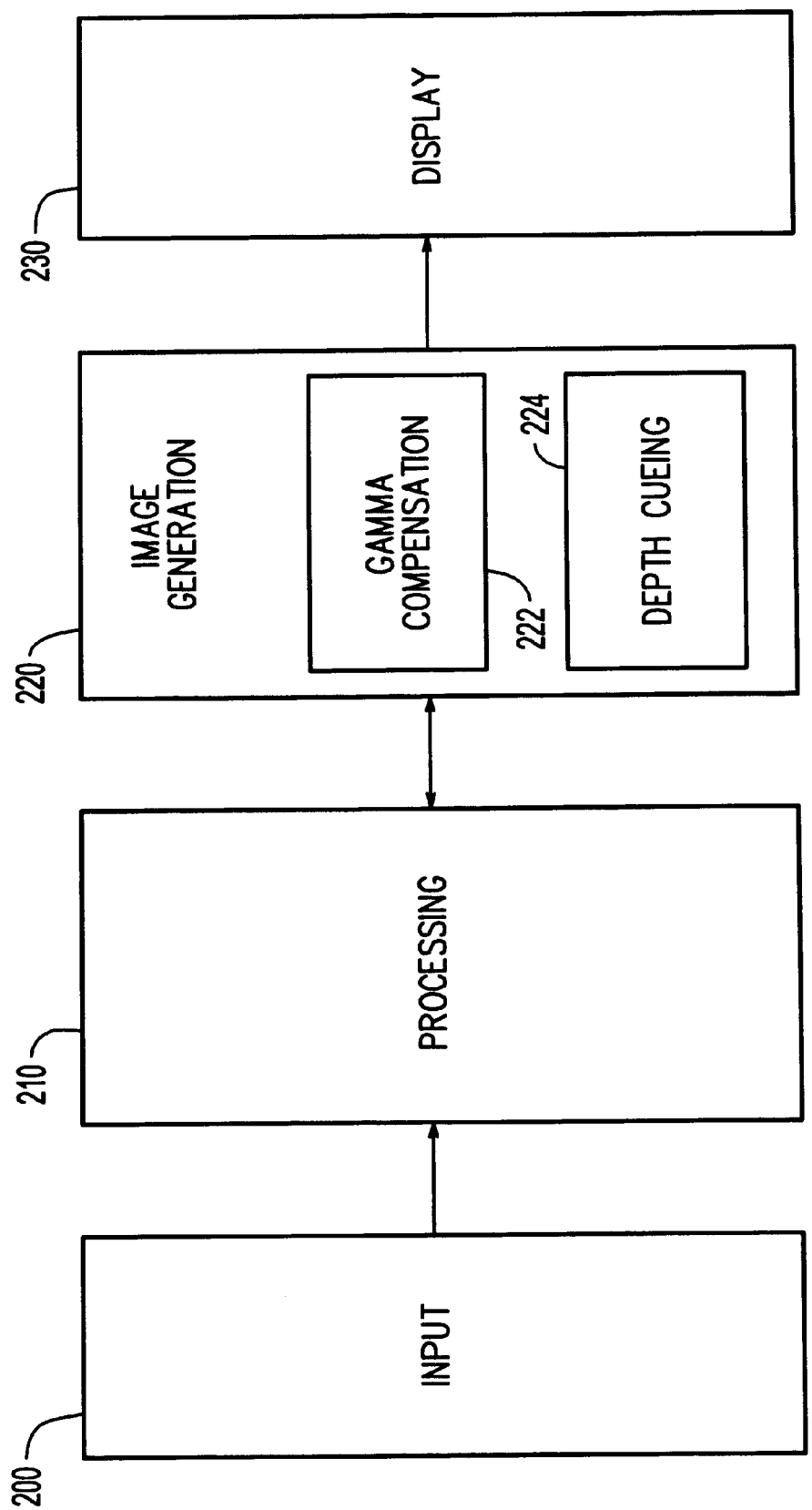
FIG. 12 is a function block diagram of an example of the configuration of an image generation device in accordance with Embodiment 2.

A second embodiment of the present invention relates to an image generation device that uses the look-up table device of Embodiment 1, and a typical function block diagram thereof is shown in FIG. 12.

An input unit 200 inputs various kinds of information that are input by a user, such as a player, and is equivalent to a game controller or the like if the device is installed in a game device.

A processing unit 210 performs various processes for image or sound generation, based on input information from the input unit 200, and it could be configured of hardware such as a CPU or memory.

An image generation unit 220 performs image generation in accordance with instructions from the processing unit 210 and output the created images to a display unit 230, and it could be configured of hardware such as an image generation ASIC, a DSP, or memory. Note that, for example, when a RISC type of CPU incorporating a sum of product computation circuit is used, the processing unit 210 and the image generation unit 220 could be configured of the same hardware.

The image generation unit 220 comprises a gamma compensation unit 222 and a depth cueing unit 224. Embodiment 2 is characterized in that the gamma compensation and depth cueing done by the gamma compensation unit 222 and the depth cueing unit 224 is implemented by the look-up table device described with reference to Embodiment 1.

Figure 13A:
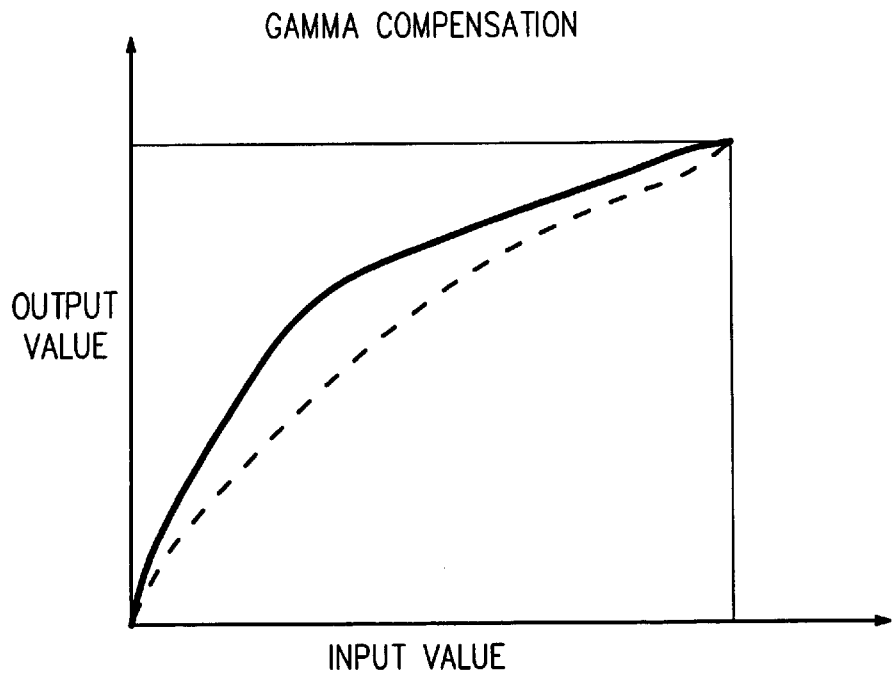
FIGS. 13A and 13B illustrate gamma compensation and depth cueing.
Figure 13B:
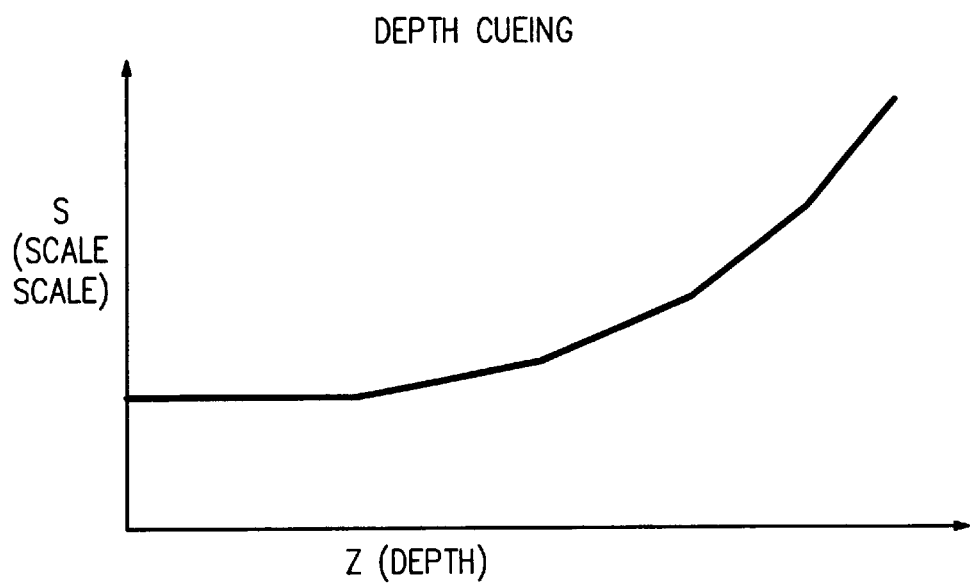

Examples of conversion characteristics of gamma compensation and depth cueing are shown in FIGS. 13A and 13B. When these conversions are implemented by the look-up table device of Embodiment 1, the input value of FIG. 13A is DIN and the output value is DOUT. Similarly, Z (depth) of FIG. 13B is DIN and S (scale factor) is DOUT.

When gamma compensation is implemented, it is necessary to modify the conversion characteristic according to the type and characteristics of the display unit 230 that is used (such as CRT or LCD). When the look-up table device of Embodiment 1 is used, this can be done in a simple manner by changing the contents stored in the delimiter information storage unit 12 and the computation parameter storage unit 22.

When depth cueing is done, the scale factor S is used in processing for bringing colors closer to a target color, by way of example. This makes it possible to obtain the visual effect of "fog" wherein colors fade closer to white the further away they are from the viewpoint, or the visual effect of "sunset" wherein colors become redder the further away they are from the viewpoint, by setting a Z-S conversion characteristic such that the color of an object becomes closer to a background color as the depth Z becomes greater. It is preferable that the user, such as a programmer, can freely set this Z-S conversion characteristic as required, and this can be done easily with the look-up table device of Embodiment 1, by simply changing the contents stored in the delimiter information storage unit 12 and the computation parameter storage unit Z2.

The depth Z, for example, often has a large bit length, such as 32 bits. With a conventional look-up table device, when the bit length of Z is so large, the storage capacity that is necessary for such a table will become extremely large. When the look-up table device of Embodiment 1 is used instead, depth cueing can be implemented with a limited storage capacity, even if Z has a large bit length.

Note that the present invention is not limited to Embodiments 1 and 2 as described above, and thus it can be used to implement various other conversions, within the scope of the invention For example, the configurations of the section deriving means, computation parameter output means, and computation means are not limited to the above embodiments that illustrated mere examples thereof, and thus the present invention is not to be taken as being limited thereto.

In addition, the look-up table device of the Present invention is not limited to gamma compensation and depth cueing alone; it can also be applied to various other forms of conversion processing. Furthermore, the look-up table device of the present invention is not limited to an image generation device; it can also be applied to various other devices such as a sound generation device.

What is claimed is:

1. A look-up table device for converting a digital input value into a digital output value, comprising:
    section deriving means for receiving said digital input value, deriving the section to which said digital input value belongs, and outputting section information that is specifies said section;
    computation parameter output means for receiving said section information and outputting a computational parameter corresponding to said section information; and
    computation means for receiving said digital input value and said computation parameter, performing a given computation based on said digital input value and said computation parameter, and outputting the result of said computation as said digital output value;
    wherein said computation parameter output means outputs the coefficients $a_m$ to $a_0$ of the expression $a_m x^m + a_{m-1} x^{m-1} + \ldots a_1 x + a_0$ in m (where m is greater than or equal to 1) degree expression, as said computation parameters; and
    said computation means obtains $a_m x^m + a_{m-1} x^{m-1} + \ldots a_1 x + a_0$, based on x that is specified by said digital input value and $a_m$ to $a_0$ that are included within said computation parameters, and outputs the obtained result as said digital output value.

2. The look-up table device as defined in claim 1, wherein said section deriving means comprises means for storing delimiter information of sections classifying said digital input value, and derives the section to which said digital input value belongs based on said delimiter information.

3. The look-up table device as defined in claim 2, wherein said computation parameter output means comprises means for storing a computation parameter corresponding to each of said section information, and reads out said computation parameters from said storage means based on said section information.

4. The look-up table device as defined in claim 2, wherein said computation means obtains a difference value between said digital input value and a delimiter value that is specified by the delimiter information of the section to which said digital input value belongs, and performs said given computation based on said difference value and said computation parameter.

5. An image generation device comprising:
    at least one of a gamma compensation means that performs gamma compensation by using a look-up table device, and a depth cueing means that performs depth cueing by using said look-up table device; and
    means for generating an image to which at least one of gamma compensation and depth cueing has been applied,
    wherein said look-up table device comprises:
        section deriving means for receiving said digital input value, deriving the section to which said digital input value belongs, and outputting section information that is specifies said section, said section deriving means comprising means for storing delimiter information of sections classifying said digital input value, said section deriving means deriving the section to which said digital input value belongs based on said delimiter information;
        computation parameter output means for receiving said section information and outputting a computational parameter corresponding to said section information; and
        computation means for receiving said digital input value and said computation parameter, performing a given computation based on said digital input value and said computation parameter, and outputting the result of said computation as said digital output value, wherein said computation parameter output means outputs the coefficients $a_m$ to $a_0$ of the expression $a_m x^m + a_{m-1} x^{m-1} + \ldots a_1 x + a_0$ in m (where m is greater than or equal to 1) degree expression, as said computation parameters, and said computation means obtains $a_m x^m + a_{m-1} x^{m-1} + \ldots a_1 x + a_0$, based on x that is specified by said digital input value and $a_m$ to $a_0$ that are included within said computation parameters, and outputs the obtained result as said digital output value.

6. The look-up table device as defined in claim 1, wherein said computation parameter output means comprises means for storing a computation parameter corresponding to each of said section information, and reads out said computation parameters from said storage means based on said section information.

7. The look-up table device as defined in claim 3, wherein said computation means obtains a difference value between said digital input value and a delimiter value that is specified by delimiter information of the section to which said digital input value belongs, and performs said given computation based on said difference value and said computation parameter.

8. An image generation device comprising:

at least one of a gamma compensation means that performs gamma compensation by using a look-up table device, and a depth cueing means that performs depth cueing by using said look-up table device; and means for generating an image to which at least one of gamma compensation and depth cueing has been applied, wherein said look-up table device comprises:

section deriving means for receiving said digital input value, deriving the section to which said digital input value belongs, and outputting section information that is specifies said section;

computation parameter output means for receiving said section information and outputting a computational parameter corresponding to said section information, said computation parameter output means comprising means for storing a computation parameter corresponding to each of said section information, said computation parameter output means reading out said computation parameters from said storage means based on said section information; and computation means for receiving said digital input value and said computation parameter, performing a given computation based on said digital input value and said computation parameter, and outputting the result of said computation as said digital output value, wherein said computation parameter output means outputs the coefficients $a_m$ to $a_0$ of the expression $a_m x^m + a_{m-1} x^{m-1} + \ldots a_1 x + a_0$ in m (where m is greater than or equal to 1) degree expression, as said computation parameters, and said computation means obtains $a_m x^m + a_{m-1} x^{m-1} + \ldots a_1 x + a_0$, based on x that is specified by said digital input value and $a_m$ to $a_0$ that are included within said computation parameters, and outputs the obtained result as said digital output value.

9. The look-up table device as defined in claim 1, wherein said computation means obtains a difference value between said digital input value and a delimiter value that is specified by delimiter information of the section to which said digital input value belongs, and performs said given computation based on said difference value and said computation parameter.

10. An image generation device comprising:

at least one of a gamma compensation means that performs gamma compensation by using a look-up table device, and a depth cueing means that performs depth cueing by using said look-up table device; and means for generating an image to which at least one of gamma compensation and depth cueing has been applied, wherein said look-up table device comprises:

section deriving means for receiving said digital input value, deriving the section to which said digital input value belongs, and outputting section information that is specifies said section, said section deriving means comprising means for storing delimiter information of sections classifying said digital input value, said section deriving means deriving the section to which said digital input value belongs based on said delimiter information;

computation parameter output means for receiving said section information and outputting a computational parameter corresponding to said section information, said computation parameter output means comprising means for storing a computation parameter corresponding to each of said section information, said computation parameter output means reading out said computation parameters from said storage means based on said section information; and computation means for receiving said digital input value and said computation parameter, performing a given computation based on said digital input value and said computation parameter, and outputting the result of said computation as said digital output value, wherein said computation parameter output means outputs the coefficients $a_m$ to $a_0$ of the expression $a_m x^m + a_{m-1} x^{m-1} + \ldots a_1 x + a_0$ in m (where m is greater than or equal to 1) degree expression, as said computation parameters, and said computation means obtains $a_m x^m + a_{m-1} x^{m-1} + \ldots a_1 x + a_0$, based on x that is specified by said digital input value and $a_m$ to $a_0$ that are included within said computation parameters, and outputs the obtained result as said digital output value.

11. An image generation device comprising:

at least one of a gamma compensation means that performs gamma compensation by using a look-up table device, and a depth cueing means that performs depth cueing by using said look-up table device; and means for generating an image to which at least one of gamma compensation and depth cueing has been applied, wherein said look-up table device comprises:

section deriving means for receiving said digital input value, deriving the section to which said digital input value belongs, and outputting section information that is specifies said section;

computation parameter output means for receiving said section information and outputting a computational parameter corresponding to said section information; and computation means for receiving said digital input value and said computation parameter, performing a given computation based on said digital input value and said computation parameter, and outputting the result of said computation as said digital output value, wherein said computation parameter output means outputs the coefficients $a_m$ to $a_0$ of the expression $a_m x^m + a_{m-1} x^{m-1} + \ldots a_1 x + a_0$ in m (where m is greater than or equal to 1) degree expression, as said computation parameters, and said computation means obtains $a_m x^m + a_{m-1} x^{m-1} + \ldots a_1 x + a_0$, based on x that is specified by said digital input value and $a_m$ to $a_0$ that are included within said computation parameters, and outputs the obtained result as said digital output value.

* * * * *